(12) United States Patent
Miyakawa et al.

(10) Patent No.: US 7,395,846 B2
(45) Date of Patent: Jul. 8, 2008

(54) METHOD AND APPARATUS FOR BONDING FLEXIBLE BOARD

(75) Inventors: Yoshihiko Miyakawa, Tokyo (JP);
Hidetoshi Suzuki, Tokyo (JP); Akimasa Nakao, Tokyo (JP)

(73) Assignee: TDK Corporation, Tokyo (JP)

( * ) Notice: Subject to any disclaimer, the term of this patent is extended or adjusted under 35 U.S.C. 154(b) by 402 days.

(21) Appl. No.: 10/832,335

(22) Filed: Apr. 27, 2004

(65) Prior Publication Data

US 2004/0238113 A1 Dec. 2, 2004

(30) Foreign Application Priority Data

May 30, 2003 (JP) .............................. 2003-153624

(51) Int. Cl.
*B65C 9/08* (2006.01)
(52) U.S. Cl. ......................................... 156/571; 72/293
(58) Field of Classification Search ................... 269/21;
156/539, 538, 285, 190, 196; 204/297.03;
29/743, 738, 700
See application file for complete search history.

(56) References Cited

U.S. PATENT DOCUMENTS 6,345,818 B1 * 2/2002 Stephan et al. ................ 271/91
6,886,827 B2 * 5/2005 Dachtler ...................... 271/106
7,063,758 B2 * 6/2006 Sakayori et al. ............... 156/87

FOREIGN PATENT DOCUMENTS

JP     2002-288812    10/2002

* cited by examiner

*Primary Examiner*—Jeff H. Aftergut
*Assistant Examiner*—Daniel McNally
(74) *Attorney, Agent, or Firm*—Oblon, Spivak, McClelland, Maier & Neustadt, P.C.

(57) ABSTRACT

A flexible board bonding method is a method in which a flexible board is bonded to a head holding member having a bent projection, provided with a load beam and a flexible member. The flexile board is sucked by a main suction head and a sub suction head positioned on the flexible board, and then the sub suction head is shifted in such a way that the sub suction head remains within an area defined by a rotation center located substantially at the main suction head and a rotation radius extending substantially between the main suction head and the sub suction head. Then, the flexible board is bonded to the head holding member at the main suction head side under the state in which the flexible board is kept away from said the bent projection by bending of the flexible board.

10 Claims, 5 Drawing Sheets

METHOD AND APPARATUS FOR BONDING FLEXIBLE BOARD

BACKGROUND OF THE INVENTION

1. Field of the Invention

The present invention relates to a method and an apparatus for bonding a flexible board, and more particularly, to a method and an apparatus for bonding a flexible board suitable for bonding a flexible printed circuit board to a head holding member that constitutes a magnetic head (for a hard disk drive apparatus).

2. Related Background Art

In conventional magnetic heads for use in hard disk drives, lead wires are drawn out via an electrode pad from the slider side in which an MR element etc. are built in, and the lead wires are soldered to a flexible printed circuit board to allow signal input and signal output through the slider side.

However, in magnetic heads in recent years, with downsizing of sliders or the use of negative pressure sliders, the force for pressing a recording medium (so-called load pressure) has become extremely low. As a result, the above-described structure might suffer from the problem that the aforementioned force for pressing a recording medium can vary depending on the rigidity of the lead wires.

In order to solve this problem, there has been known a method in which the slider and the flexible printed circuit are electrically connected directly without using a lead wire.

FIG. 6 is a perspective view showing how a flexible printed circuit board is bonded to a head holding member.

As shown in FIG. 6, a head holding member 1 that constitutes a magnetic head is provided with a flexible member (or a flexure) 3 disposed between a load beam 2 and the aforementioned slider. The flexible member has elasticity to ensure a degree of freedom of the slider. A flexible printed circuit board 5 is bonded to the head holding member 1 having the above-described structure along the direction indicated by an arrow 4.

In the process of bonding the aforementioned flexible printed circuit board 5 to the head holding member 1, the flexible printed circuit board 5 arranged on a tray is first sucked by a suction head by area A shown in FIG. 6, and the suction head is then moved to a position above the head holding member 1 placed on a support table for bonding while maintaining the suction. After the flexible printed circuit board 5 is moved to the position above the head holding member 1, the suction head is lowered, so that the flexible circuit board 5 is bonded to one surface of the head holding member 1 on which an adhesive has been attached in advance. Alignment of the flexible printed circuit board 5 relative to the head holding member 1 is generally carried out using image processing. Specifically, when the flexible printed circuit board 5 is moved while maintained in a suctioned state, a center hole, for example, of the flexible printed circuit board 5 is detected by a CCD or the like and its positional difference relative to the head holding member 1 set on the support table is calculated. Thus, bonding is carried out after the position of the suction head has been aligned with the position of the head holding member 1.

A suction head as shown in FIG. 7 has also been known as one to be used in bonding a flexible printed circuit board (see FIGS. 1 and 2 of Japanese Patent Application Laid-Open No. 2002-288812).

As shown in FIG. 7 which shows the cross sectional structure of a suction head, the suction head 6 is provided with suction ports at positions corresponding to both end portions of a flexible printed circuit board 7 so that it can pick up the flexible printed circuit board as a whole by suction. At the slider side end of the suction head 6, there is provided a main head 8 and a sub head 9 independently from each other so that the flexible printed circuit board 7 can be pressed against a load beam 10 and a flexible member 11 with a load and a range that meet respective requirements. A difference in height as small as that of the load beam 10 and the elastic member 11 can be absorbed by this structure.

However, the above described method suffers from the following problem.

That is, in the method in which the flexible printed circuit board 5 is bonded to the head holding member 1 under the condition in which only area A of the flexible printed circuit board 5 is sucked, the portion of the flexible printed circuit board 5 other than area A is dragged, and there is the risk that displacement or deformation such as bending can occur in the flexible printed circuit board 5 while it is moved to the head holding member 1. Even if the dragging does not occur in the portion other than area A, the weight of the flexible printed circuit board 5 will be concentrated at the portion around area A, so that the aforementioned deformation can occur due to this stress concentration. Furthermore, in magnetic heads in recent years, strict precision in bonding is required not only at the slider side but also at the other side from the view point of improvement in facility of assembling. In view of this, it is difficult to achieve alignment of the aforementioned other end by a process of suction applied only to area A, and specifications required by the market cannot be achieved.

On the other hand, in the case of the suction head 6 that can pick up the flexible printed circuit board 7 as a whole, although precision in bonding of both end portions of the flexible printed circuit board can be ensured, there is another problem in that establishment of suction depends on the shape of the head holding member 12.

Specifically, the aforementioned suction head 6 can press a flexible printed circuit board against a load beam 2 having a flat shape as shown in FIG. 6, but such cannot press a flexible printed circuit board against a load beam 13 having a non-flat bonding surface in the form of a bent portion 14 as shown in FIG. 8.

One method that was conceived was to bend a flexible printed circuit board in a tray precedently in such a way as to be kept away from the step of the head holding member and bonding it to the head holding member while keeping that state. However, this method is not practical, since there is the risk that the flexible printed circuit board can be deformed by the aforementioned bending.

SUMMARY OF THE INVENTION

In view of the above problems of prior arts, an object of the present invention is to provide a bonding method and a bonding apparatus with which a flexible printed circuit board can be bonded with high precision even to a bonding object or a head holding member having a projection portion that projects from the bonding surface.

The present invention has been made based on an inventive concept that by differentiating the movement trajectory of the suction heads for applying suction to a flexible printed circuit board along the longitudinal direction, even if there is a stepped portion on the head holding member, bonding can be carried out without interfering with the stepped portion.

A flexible board bonding method according to the present invention is such a method in which a flexible board is bonded to a bonding target member having a projection portion projecting from a bonding surface, comprising the steps of applying suction to said flexile board by a main suction head and a sub suction head positioned on said flexible board, and bonding, thereafter, said flexible board to said head holding member at said main suction head side while shifting said sub suction head in such a way that said sub suction head remains within an area defined by a rotation center located substantially at said main suction head and a rotation radius extending substantially between said main suction head and said sub suction head, to bend said flexible board so as to keep it away from said projection portion.

According to more specific aspect of the present invention, there is provided a flexible board bonding method in which a flexible board is bonded to a head holding member having a bent projection, provided with a load beam and a flexible member, comprising the steps of applying suction to said flexile board by a main suction head and a sub suction head positioned on said flexible board, and bonding, thereafter, said flexible board to said head holding member at said main suction head side while shifting said sub suction head in such a way that said sub suction head remains within an area defined by a rotation center located substantially at said main suction head and a rotation radius extending substantially between said main suction head and said sub suction head, to bend said flexible board so as to keep it away from said bent projection.

In the flexible board bonding method according to the present invention, it is preferable that a movement trajectory of said sub suction head be on a circular arc trajectory defined by a rotation radius extending between said main suction head and said sub suction head. In addition, the aforementioned circular arc trajectory may be modified into a linear trajectory that is kept within the aforementioned area.

Furthermore, in the flexible board bonding method according to the present invention, it is preferable that the suction force of said sub suction head be made smaller than the suction force of said main suction head until shifting of said sub suction head is completed, and that the suction force of said sub suction head be released upon bonding of the flexible board to the head holding member.

A flexible board bonding apparatus according to the present invention is an apparatus for bonding a flexible board to a head holding member having a bent projection, provided with a load beam and a flexible member, comprising a main suction head capable of sucking said flexible board, a sub suction head capable of sucking another portion of said flexible board, said sub suction head being shiftable while being kept within an area defined by a rotation center located substantially at said main suction head and a rotation radius extending substantially between said main suction head and said sub suction head, and up-and-down means that holds said main suction head and said sub suction head, capable of bringing said main suction head and said sub suction head into contact with and away from said head holding member wherein, said apparatus carrying out bonding of said flexible board to said head holding member at said main suction head side while shifting said sub suction head to bend said flexible board so as to keep it away from said bent projection and activating said up-and-down means.

In the flexible board bonding apparatus according to the present invention, it is preferable that said sub suction head be shifted along shifting means disposed on a circular arc trajectory defined by a rotation radius extending between said main suction head and said sub suction head. The aforementioned circular arc trajectory be modified into a linear trajectory that is kept within said area.

In the flexible board bonding apparatus according to the present invention, in said main suction head and said sub suction head respectively, there may be provided opening/closing means and pressure regulating means for performing regulation and release of suction force independently.

With the above structure, a flexible board in a horizontal state is sucked by the main suction head and sub suction head and then moved to a position above the head holding member with the horizontal state being kept. After the flexible board has been moved to the position above the head holding member, the sub suction head is driven so as to prevent the flexible board from interfering with a bent projection of the head holding member. By moving the sub suction head in this way, the flexible board sucked by the sub suction head is bent substantially about the main suction head by an amount that will keep the flexible board away from the aforementioned bent projection. Thus, when the main suction head and the sub suction head are lowered onto the head holding member, the sub suction head side portion of the flexible board does not interfere with the bent projection, and the flexible board can be pressed against the head holding member at the main suction head side.

DESCRIPTION OF THE PREFERRED EMBODIMENTS

In the following, a preferred embodiment of the method and apparatus for bonding a flexible printed circuit board according to the present invention will be specifically described with reference to the accompanying drawings.

Figure 1:
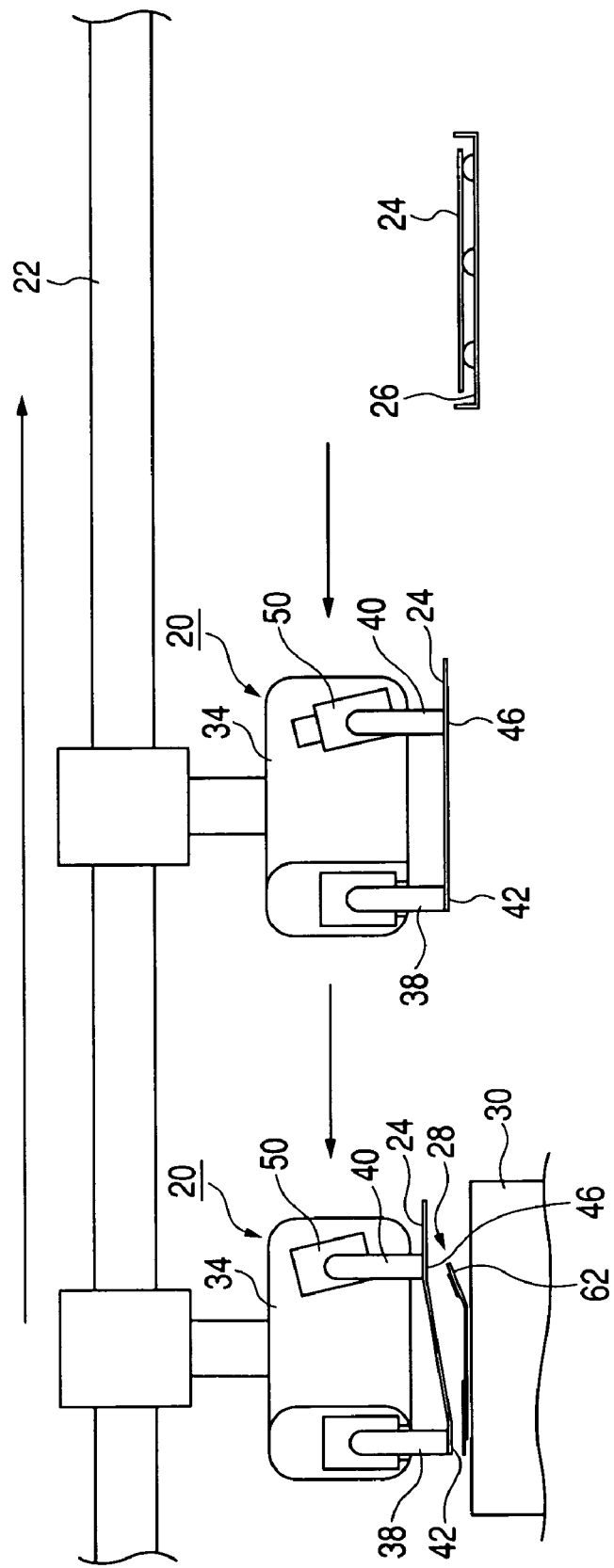
FIG. 1 is a front view showing a case in which an apparatus for bonding a flexible printed circuit board according to an embodiment of the present invention is applied to a process for manufacturing a magnetic head.

FIG. 1 is a front view showing a case in which an apparatus for bonding a flexible printed circuit board according to the present embodiment is applied to a process for manufacturing a magnetic head.

As will be seen from FIG. 1, the flexible printed circuit board bonding apparatus 20 according to the present embodiment is suspended on a guide rail 22 provided above the bonding apparatus 20. The bonding apparatus 20 can be moved back and forth along the guide rail 22. A well-known device such as a servo motor or a linear motor may be used as means for moving the bonding apparatus 20 back and forth.

A tray 26 for accommodating flexible printed circuit boards 24 before boding is provided at one end of the guide rail 22. At the other end of the guide rail 22, there is provided a support table 30 on which a head holding member 28 is to be placed and bonding of the flexible printed circuit board is carried out.

Figure 2:
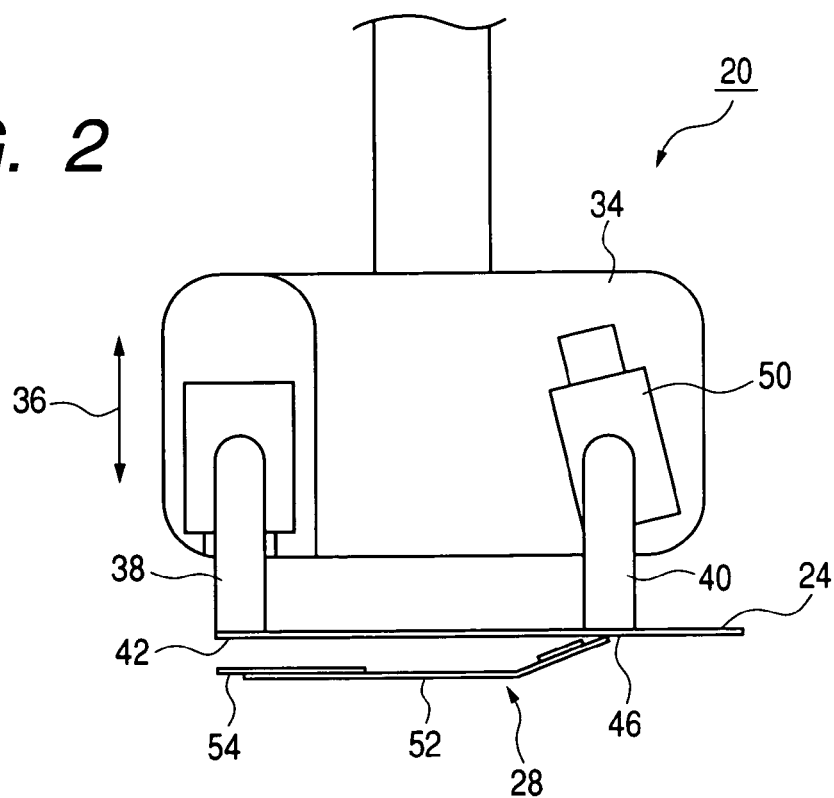
FIG. 2 is a front view showing the bonding apparatus in a state in which a flexible printed circuit board in a horizontal state has suction applied thereto.
Figure 3:
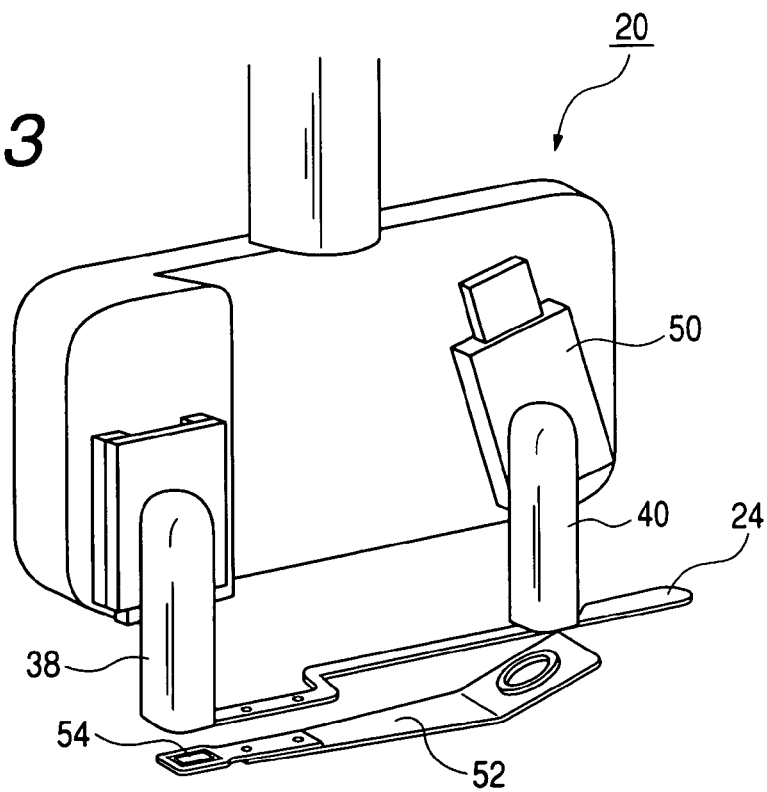
FIG. 3 is a perspective view showing the bonding apparatus in the same state as shown in FIG. 2.

FIG. 2 is a front view showing the bonding apparatus in a state in which a flexible printed circuit board in a horizontal state has suction applied thereto. FIG. 3 is a perspective view showing the same bonding apparatus in the same state as in FIG. 2.

As shown in FIGS. 2 and 3, the bonding apparatus 20 suspended from the guide rail 22 (shown in FIG. 1) is provided with a rear plate (not shown) for allowing sliding movement of the bonding apparatus along the guide rail and an up-and-down or vertically movable portion 34 slidably coupled with the rear plate that can reciprocate along the direction indicated by an arrow 36. Known up-and-down means such as a combination of a stepping motor or a DC servo motor with a ball screw may be used for moving the up-and-down portion 34 relative to the rear plate.

On the front side of the up-and-down portion 34, there is provided a pair of suction heads including a main suction head 38 and sub suction head 40. These two suction heads are disposed at positions spaced apart from each other by a distance that allows the heads to suck both end portions of the flexible printed circuit board 24 as an object to be sucked. Although the suction heads are arranged at positions corresponding to both end portions of the flexible printed circuit board 24 in this embodiment, the arrangement of the suction heads is not limited to this particular positions. For example, the suction heads may be arranged along the longitudinal direction of the flexible printed circuit board in accordance with the shape of the flexible printed circuit board or the bonding position.

The main suction head 38 is adapted to suck the slider side end portion of the flexible printed circuit board 24. Therefore, a main-side pressing portion 42 that is flat in shape and that can be in contact at least with the flexible printed circuit board 24 is formed on the tip end of the main suction head 38. A suction port that is not shown in the drawings is formed inside the main-side pressing portion 42 so that air can be suctioned through the suction port by means of a main-side air pipe connected to the main suction head 38.

On the other hand, the sub suction head 40 adjacent to the main suction head 38 also has a sub-side pressing portion 46 that is flat in shape and that can be in contact at least with the flexible printed circuit board 24 formed on its tip end for enabling suction of the flexible printed circuit board 24 in the same manner as the main suction head 38. A suction port that is not shown in the drawings is formed inside the sub-side pressing portion 46 so that air can be suctioned through the suction port by means of a sub-side air pipe connected to the sub-side suction head 38. In connection with this, on the source side of the aforementioned main-side air pipe 44 and the sub-side air pipe, there is provided regulators (not shown) serving as pressure regulating means and solenoid valves serving as opening/closing means for shutting the pipe paths separately so that different settings can be applied to the main-side air pipe and the sub-side air pipe.

The sub suction head 40 is mounted on a support member 50 that can be reciprocated by an external supply of air, and the flexible printed circuit board 24 held in a horizontal state can be bent by moving the support member 50 in an oblique upward direction. The shift amount of the support member 50 should be set equal to a distance ensuring that the flexible printed circuit board 24 is kept away from a bent projection 62 formed on a head holding member 28, which will be described later.

In the following, mounting orientation of the support member 50 that determine the trajectory of the movement of the sub suction head 40 will be described.

Figure 4:
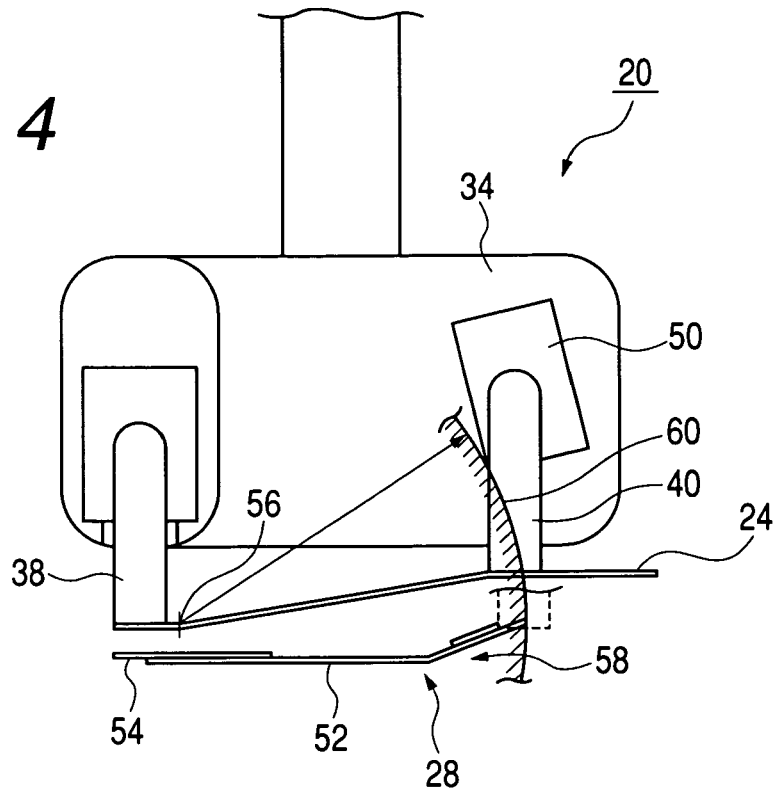
FIG. 4 is a front view showing the bonding apparatus in a state in which a flexible printed circuit board in a bent state has suction applied thereto.
Figure 5:
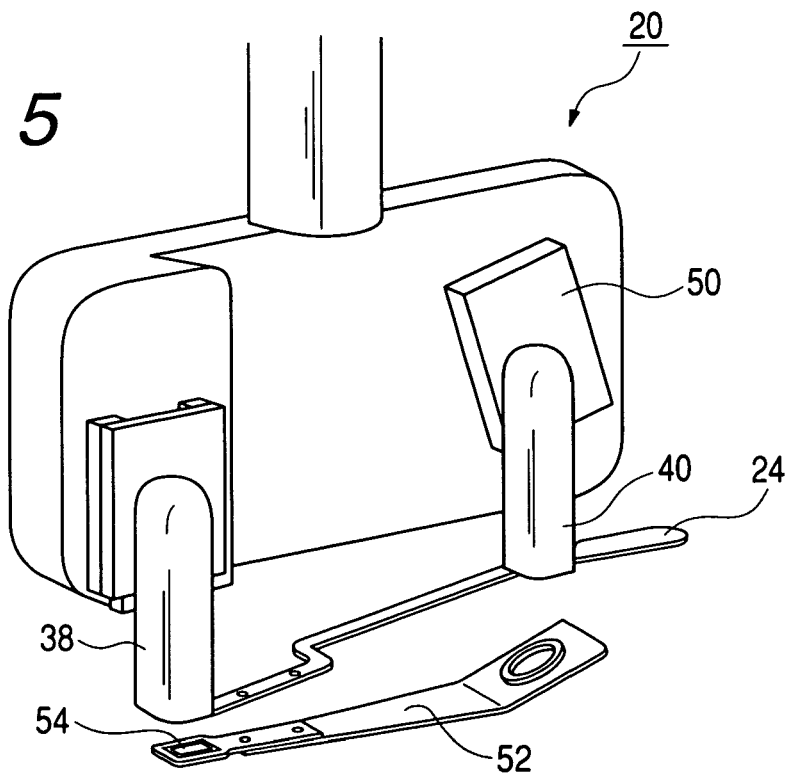
FIG. 5 is a perspective view showing the bonding apparatus in the same state as shown in FIG. 4.
Figure 6:
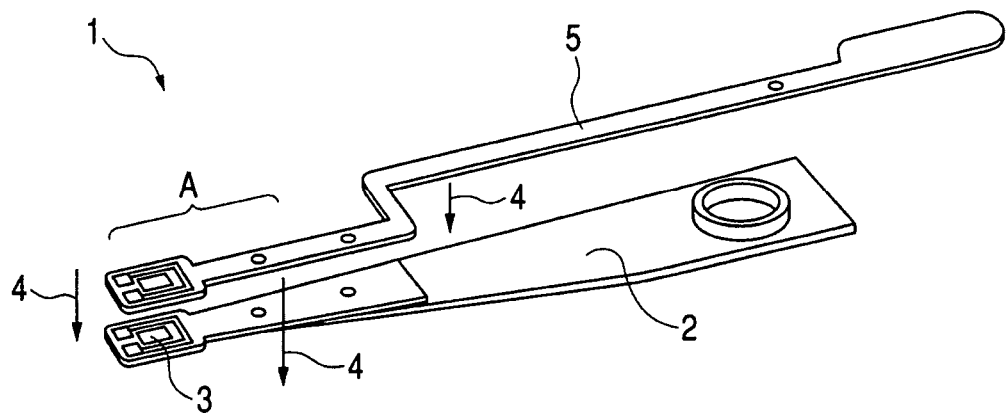
FIG. 6 is a perspective view showing how a flexible printed circuit board is bonded to a head holding member.
Figure 7:
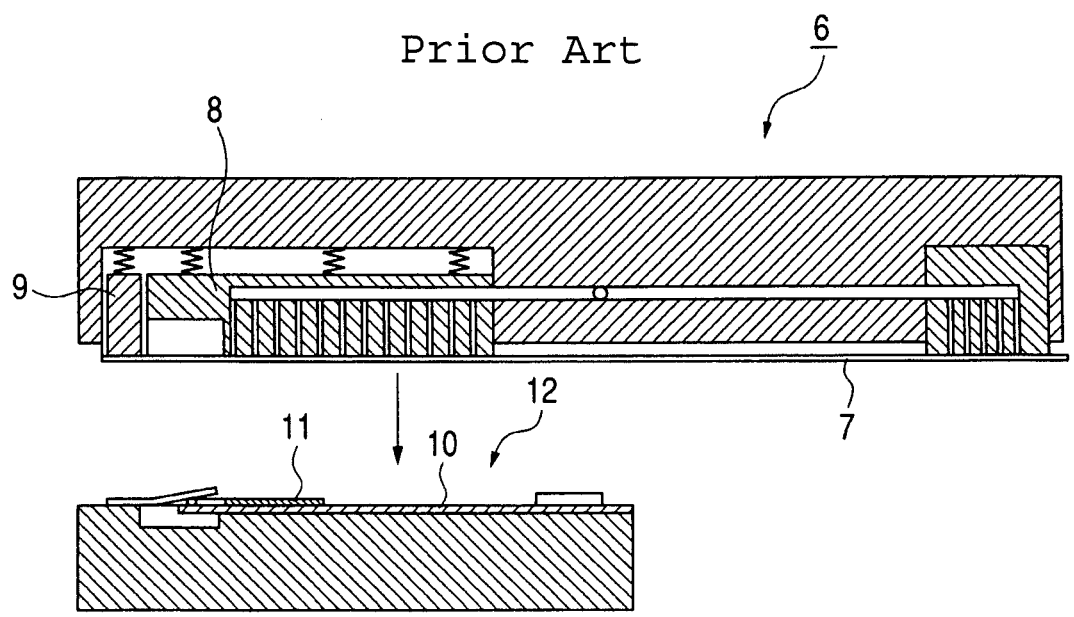
FIG. 7 is a cross sectional view showing the structure of a suction head.
Figure 8:
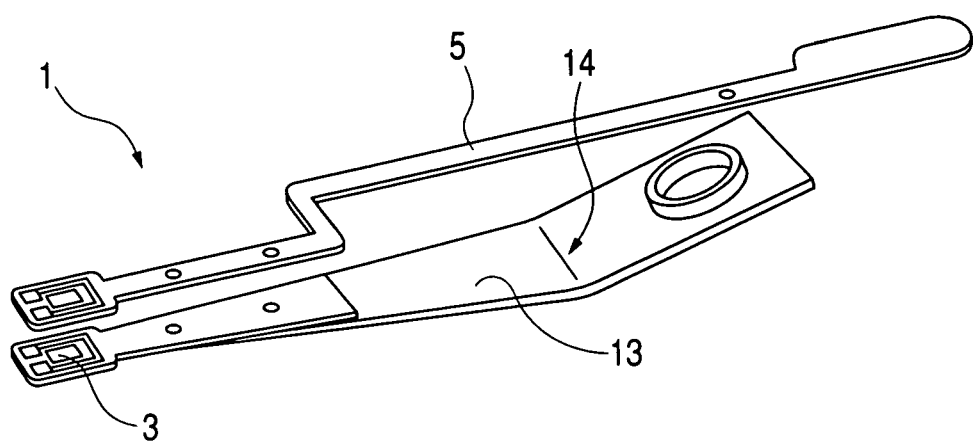
FIG. 8 is a perspective view showing a head holding member that has been processed so as to be bent.

FIG. 4 is a front view showing the bonding apparatus in which a flexible printed circuit board in a bent state is sucked in contrast to FIGS. 2 and 3. FIG. 5 is a perspective view showing the bonding apparatus in the state same as in FIG. 4.

As shown in FIGS. 4 and 5, the support member 50 in the bonding apparatus 20 is mounted in an inclined orientation with respect to the vertical direction. As a result, in the case where the load beam of a head holding member 28 that constitutes a magnetic head has been bent by a bending processing so as to have a bent projection 62 that projects from the bonding surface of the load beam 52 or the flexible member 54 to which the flexible printed circuit board 24 is to be bonded, the sub suction head 40 is moved upwardly while applying suction to the flexile printed circuit board 24. Thus, the flexible printed circuit board 24 can be bonded to the load beam 52 or the flexible member 54 without interfering with the load beam 52.

The movement range of the support member 50 that determines the movement trajectory of the sub suction head 40 is designed to be kept within the area 58 that is defined by a center of bending 56 near the edge of the main suction head 38 and a rotation radius extending between the main suction head 38 and the sub suction head 40. Provided that the movement range of the support member 50 is limited to the aforementioned area 58 within the radius, movement of the support member 50 will not generate tensile stress in the flexible printed circuit board 24, and therefore it is possible to avoid such a situation that the flexible printed circuit board 24 is displaced from the main suction head or the sub suction head 40 or that the flexible printed circuit board 24 itself is deformed. Tensile stress generated in the flexible printed circuit board 24 with movement of the support member 50 can be reduced further by moving the support member 50 along the trajectory 60 that coincides with the outer edge of the aforementioned area 58. In the case that the movement trajectory of the support member 50 is set as noted above, the distance between the main suction head 38 and the sub suction head 40 serving as the rotation radius will not vary when the support member 50 is moved. Therefore, it is possible to avoid not only generation of tensile stress in the flexible printed circuit board 24 but also deformation of the flexible printed circuit board 24 itself. It is ideal that the movement trajectory of the support member 50 coincide with the outer edge of the aforementioned area 58. This can be achieved by using a cam mechanism or the like.

Although the above-described trajectory that coincides with an circular arc trajectory is ideal, the trajectory is not limited to this, and other trajectories may also be used.

In fact, in the case of the support member 50 according to the present embodiment, the movement trajectory is designed as a linear trajectory instead of the above described circular arc trajectory. The shift amount of the support member 50 should be set equal to a distance for ensuring that the flexible printed circuit board 24 is kept away from a bent projection 62 of the head holding member 28 as a bonding target. If that distance is small, the variation of the radius is also small, and therefore stress in the flexible printed circuit board 24 can be suppressed. Consequently, it is possible to prevent adverse effects such as displacement or deformation from occurring in the flexible printed circuit board 24. In addition, use of a linear trajectory as an approximation for the movement trajectory of the support member 50 is advantageous, because it is not necessary to provide a cam mechanism or like structures for moving the support member 50 in a circular arc trajectory and the up-and-down portion 34 can be made compact.

In the following discussion, a process of bonding the flexible printed circuit board 24 to the head holding member 28 for use in a magnetic head by means of the bonding apparatus 20 having the above-described structure will be described with reference to FIG. 1.

Upon bonding the flexible printed circuit board 24 to the head holding member 28, the bonding apparatus 20 is first moved to the right in FIG. 1 along the guide rail 22. The bonding apparatus 20 is stopped at a position above the tray 26 in which flexible printed circuit boards 24 are arranged before bonding.

After the bonding apparatus 20 is stopped above the tray 26, the up-and-down portion 34 is lowered by up-and-down means so that the main-side pressing portion 42 of the main suction head 38 and the sub-side pressing portion 46 of the sub suction head 40 are pressed against the flexible printed circuit board 24. Simultaneously, a suction force is generated through the main-side air pipe and the sub-side air pipe so that the flexible printed circuit board 24 has suction applied thereto. The flexible printed circuit board 24 is has suction applied thereto by these suction heads at both end portions independently, where it is desirable that the suction force (i.e. negative pressure) of the main suction head 38 be made larger than that of the sub suction head 40. With such a difference in the suction force between the two heads, when an external force is exerted on the flexible printed circuit board itself it is possible to prevent displacement from occurring at the side in which the suction force is larger. Therefore, it is possible to carry out the bonding with high precision by keeping the difference in suction force just before the bonding.

After the flexible printed circuit board 24 in the tray 26 has had suction applied thereto in this way, the up-and-down portion 34 is elevated and the bonding apparatus 20 is moved to the left in FIG. 1 along the guide rail 22. While the bonding apparatus 20 is moved along the guide rail 22, a hole portion or an edge portion etc. of the flexible printed circuit board 24 is detected by a CCD camera (not shown) or the like, and the positional displacement (in the X, Y and θ directions) relative to the head holding member 28 placed on the support table 30 is calculated. After the positional displacement is calculated, the position of the bonding apparatus 20 is adjusted by a positioning mechanism (not shown in the drawings) in such a way as to eliminate the relative positional errors. From the viewpoint of improving production efficiency, it is preferable that this adjustment be carried out during the movement of the bonding apparatus.

After the relative positioning of the flexible printed circuit board 24 and the head holding member 28 placed on the support table 30 has been completed and the bonding apparatus 20 has been brought to the position above the support table 30, movement of the bonding apparatus 20 along the guide rail 22 is stopped and the up-and-down portion 34 is lowered toward the head holding member 28. It should be noted that the head holding member 28 placed on the support table 30 has already undergone a bonding process, namely an adhesive required for bonding with the flexible printed circuit board 24 has been applied on the head holding member 28.

As the up-and-down portion 34 is lowered, the support member 50 is moved toward the oblique upward direction so that the flexible printed circuit board 24 in a horizontal state is bent in such a way that it is kept away from the bent projection 62 of the head holding member 28. As has been described before, the movement trajectory of the support member 50 is a linear trajectory serving as an approximation of the trajectory 60 along the outer edge of the bending radius area 58 of the flexible printed circuit board 24. Therefore, it is possible to suppress the stress generated in the flexible printed circuit board 24 involved by the movement of the support member 50 and to prevent adverse effects such as deformation of the flexible printed circuit board 24 from occurring. In addition, since the suction force of the main suction head 38 is made larger than the suction force of the sub suction head 40 while the support member 50 is moved, even if an external force is exerted on the flexible circuit board 24, such external force can be absorbed by the sub suction head 40 side. Therefore, it is possible to avoid deterioration in position accuracy at the main suction head 38 side. Since the tolerance in position accuracy is larger at the sub suction head 40 side than at the main suction head 38 side, it is apparent that the position accuracy at the sub suction head 40 side will remain within the tolerance even after the displacement of the flexible printed circuit board has been absorbed.

As per the above discussion, it is possible to prevent the flexible printed circuit board 24 from interfering with the bent projection 62 of the head holding member 28 by shifting the sub suction head 40 upwardly by means of the support member 50. In addition, by stopping the suction force of the sub-side pressing portion 46 just before the main-side pressing portion 42 in the main suction head 38 is pressed against the head holding member 28, the flexible printed circuit board 24 is detached from the sub suction head 40. Thus, bonding at the main suction head 38 side can be carried out with high precision.

After the bonding of the flexible printed circuit board 24 to the head holding member 28 is completed, the suction force of the main suction head is turned off so that the main suction head 38 is detached from the flexible printed circuit board 24 and the up-and-down portion 34 is elevated, and then the bonding apparatus 20 is moved to the position above the tray 26 again.

As per the above, it is possible to bond the flexible printed circuit board 24 and the head holding member 28 with high precision in position by carrying out bonding while absorbing end portions of the flexible printed circuit board 24 and bending it in such a way as to be kept away from the bent projection 62 of the head holding member 28.

Although in this embodiment a flexible printed circuit board 24 is bonded to a head holding member 28 to be used as a component of a magnetic head, the present invention is not limited to this particular combination, but the present invention can be widely applied in manufacturing of other products such as, for example, an optical pickup for use in a DVD/CD reproducing apparatus or a magneto-optical recording apparatus.

Furthermore, although the description of the embodiment has been made with reference to the case in which the portion projecting from the bonding surface is a bent projection, the projected portion is not limited to the bent projection of a load beam, but it may be other projections that extend in the thickness direction of the bonding surface.

As per the above, the flexible board bonding method according to the present invention is a method in which a flexible board is bonded to a head holding member having a bent projection, provided with a load beam and a flexible member. In the method, the flexile board has suction applied thereto by a main suction head and a sub suction head positioned at end portions the flexible board, and thereafter the flexible board is bonded to the head holding member at the main suction head side while shifting the sub suction head in such a way that the sub suction head remains within an area defined by a rotation center located substantially at the main suction head and rotation radius extending substantially between the main suction head and the sub suction head, to bend the flexible board so as to keep it away from the bent projection. Thus, it is possible to bond a flexible board to a bonding target member or a head holding member that has a projection portion projecting from the bonding surface, and displacement, breakage or folding of the flexible board can be prevented.

What is claimed is:

1. A flexible board bonding apparatus for bonding a flexible board to a head holding member having a bent projection, provided with a load beam and a flexible member, comprising:
   a main suction head capable of applying suction to said flexible board;
   a sub suction head capable of sucking another portion of said flexible board, said sub suction head being shiftable while being kept within an area defined by a rotation center located substantially at an edge of said main suction head and a rotation radius extending substantially between said edge of said main suction head and said sub suction head;
   a vertically movable unit that holds said main suction head and said sub suction head, capable of bringing said main suction head and said sub suction head into contact with and moving away from said head holding member; and
   a shifting unit for moving said sub suction head on a circular arc trajectory defined by the rotation center located substantially at said edge of said main suction head and the rotation radius being substantially equal to a distance between said edge of said main suction head and said sub suction head,
   wherein said apparatus carries out bonding of said flexible board to said head holding member at said main suction head side while shifting said sub suction head to bend said flexible board so as to keep said flexible board away from said bent projection and activating said vertically movable unit.

2. A flexible board bonding apparatus according to claim 1, in said main suction head and said sub suction head respectively, there is provided an opening and closing unit and a pressure regulating unit for performing regulation and release of suction force independently.

3. A flexible board bonding apparatus according to claim 1, wherein a range of movement of said sub suction head is limited to the rotation radius.

4. A flexible board bonding apparatus according to claim 1, wherein said main suction head generates a greater suction force than that of said sub suction head.

5. A flexible board bonding apparatus for bonding a flexible board to a head holding member having a bent projection, provided with a load beam and a flexible member, comprising:
   a main suction head capable of sucking said flexible board;
   a sub suction head capable of sucking another portion of said flexible board, said sub suction head being shiftable while being kept within an area defined by a rotation center located substantially at said main suction head and a rotation radius extending substantially between said main suction head and said sub suction head;
   vertically movable means that holds said main suction head and said sub suction head, capable of bringing said main suction head and said sub suction head into contact with and moving away from said head holding member; and
   shifting means for moving said sub suction head on a linear line closely approximate to a circular arc trajectory defined by the rotation center located substantially at said main suction and the rotation radius being substantially equal to a distance between said main suction head and said sub suction head,
   wherein said apparatus carries out bonding of said flexible board to said head holding member at said main suction head side while shifting said sub suction head to bend said flexible board so as to keep said flexible board away from said bent projection and activating said vertically movable means.

6. A flexible board bonding apparatus according to claim 5, wherein in said main suction head and said sub suction head respectively, there is provided opening and closing means and pressure regulating means for performing regulation and release of suction force independently.

7. A flexible board bonding apparatus according to claim 5, wherein the shifting means moves said sub suction head on a linear line connecting two points extending on the circular arc trajectory.

8. A flexible board bonding apparatus for bonding a flexible board to a head holding member having a bent projection, provided with a load beam and a flexible member, comprising:
   a main suction head capable of sucking said flexible board;
   a sub suction head capable of sucking another portion of said flexible board, said sub suction head being shiftable while being kept within an area defined by a rotation center located substantially at said main suction head and a rotation radius extending substantially between said main suction head and said sub suction head;
   a vertically movable unit that holds said main suction head and said sub suction head, capable of bringing said main suction head and said sub suction head into contact with and moving away from said head holding member; and
   a shifting unit for moving said sub suction head on a linear line closely approximate to a circular arc trajectory defined by the rotation center located substantially at said main suction and the rotation radius being substantially equal to a distance between said main suction head and said sub suction head,
   wherein said apparatus carries out bonding of said flexible board to said head holding member at said main suction head side while shifting said sub suction head to bend said flexible board so as to keep it away from said bent projection and activating said vertically movable unit.

9. A flexible board bonding apparatus according to claim 8, wherein in said main suction head and said sub suction head respectively, there is provided an opening and closing unit and a pressure regulating unit for performing regulation and release of suction force independently.

10. A flexible board bonding apparatus according to claim 8, wherein the shifting unit moves said sub suction head on a linear line connecting two points extending on the circular arc trajectory.

* * * * *